(12) United States Patent
Broeker

(10) Patent No.: US 10,610,799 B2
(45) Date of Patent: Apr. 7, 2020

(54) HAND-EYE COORDINATION TRAINING DEVICE

(71) Applicant: Josh Broeker, Winter Garden, FL (US)

(72) Inventor: Josh Broeker, Winter Garden, FL (US)

( * ) Notice: Subject to any disclaimer, the term of this patent is extended or adjusted under 35 U.S.C. 154(b) by 303 days.

(21) Appl. No.: 15/708,173

(22) Filed: Sep. 19, 2017

(65) Prior Publication Data

US 2019/0083895 A1 Mar. 21, 2019

(51) Int. Cl.
| | |
|---|---|
| *G09B 19/00* | (2006.01) |
| *A63H 33/18* | (2006.01) |
| *A63B 65/00* | (2006.01) |
| *A63B 67/06* | (2006.01) |
| *G09B 5/00* | (2006.01) |
| *A63B 22/00* | (2006.01) |
| *A63B 67/00* | (2006.01) |
| *A63H 5/00* | (2006.01) |
| *A63H 33/26* | (2006.01) |
| *A63H 33/22* | (2006.01) |

(52) U.S. Cl.
CPC ............ *A63H 33/18* (2013.01); *A63B 22/00* (2013.01); *A63B 65/00* (2013.01); *A63B 67/007* (2013.01); *A63B 67/06* (2013.01); *G09B 5/00* (2013.01); *G09B 19/00* (2013.01); *G09B 19/0038* (2013.01); *A63B 2022/0092* (2013.01); *A63B 2207/02* (2013.01); *A63B 2225/09* (2013.01); *A63H 5/00* (2013.01); *A63H 33/22* (2013.01); *A63H 33/26* (2013.01)

(58) Field of Classification Search
CPC ...................................................... A63H 33/18
USPC ........................................................ 434/258
See application file for complete search history.

(56) References Cited

U.S. PATENT DOCUMENTS

| | | | |
|---|---|---|---|
| 7,985,137 B1 * | 7/2011 | Klitsner ................ | A63F 9/0096 463/31 |
| 2013/0040786 A1 * | 2/2013 | Heinrich .................. | A63B 5/20 482/81 |
| 2013/0137540 A1 * | 5/2013 | Jones .................. | A63B 69/0002 473/451 |

* cited by examiner

*Primary Examiner* — Kesha Frisby
(74) *Attorney, Agent, or Firm* — Albert Bordas, P.A.

(57) ABSTRACT

A hand-eye coordination training device and/or kit may be reconfigurable by the user to adjust the level of difficulty of use. The training device may have a hub with at least two couplings and at least two handles that interchangeably and releasably attach to the couplings on the hub. Each handle is physically differentiated from the others by shape, color, size, or other differentiating elements. Handles may be fillable with material that alters the rotation of the training device in flight. In use, a color or other differentiating feature is called, and the user must catch the appropriate handle. If a specific hand is called, the user must use that hand to make the catch. The training device may comprise a controller and at least one sensor that controls sound, light, or a combination of sound and light. The training device provides a gaming element to training sessions.

20 Claims, 2 Drawing Sheets

HAND-EYE COORDINATION TRAINING DEVICE

FIELD

The present disclosure relates to a hand-eye coordination training device and to a kit comprising a hand-eye coordination training device, and more particularly to a hand-eye coordination training device that is reconfigurable by the user to adjust the level of difficulty of use.

BACKGROUND

This section provides background information related to the present disclosure which is not necessarily prior art.

Various games have been sold that focus on fine motor skills involving the hands, such as Simon®, Bop-It®, and card games that require relatively quick reflexes. These games may include visual and audio stimuli.

For sports training that focuses on more extensive muscle movement, hand eye coordination training may include bouncing tennis balls, trying to catch a flubbed bouncy ball, or other challenges. These devices are often sold "as is" and are not reconfigurable to account for age, ability, and desired difficulty levels. Such training also often neglects the game element that motivates trainees.

There is need in the art for a reconfigurable hand-eye coordination training device that exercises more than just the hands, and does so by adding a game element to promote use.

SUMMARY OF THE INVENTION

This section provides a general summary of the disclosure, and is not a comprehensive disclosure of its full scope or all of its features.

In one form, the present disclosure provides a hand-eye coordination training device that is reconfigurable by the user to adjust the level of difficulty of use. The training device may have a hub with at least two or three couplings and at least two or three handles, each having at least one coupling, that interchangeably and releasably attach to the couplings on the hub. The handles are configured to be held by a human hand and may have a coating or surface texture to provide a better grasp. Each handle is physically differentiated from the others by shape, color, size, or a combination of those or other differentiating elements. One or more handles may be hollow and fillable with material that alters the rotation of the training device in flight. In use, a handle color or other differentiating feature is called, and the user must catch the appropriate handle. If a hand or other body part is called, the user must use that body part to make the catch.

In another form, the present disclosure provides a training kit that may include a hand-eye coordination training device that is reconfigurable by the user to adjust the level of difficulty of use. The kit may include one or more hubs, multiple handles of similar or differentiated types, fill material to place in a handle, instructions, and a container to hold the kit components.

The training device may comprise at least one controller and at least one sensor that control sound, light, or a combination of sound and light emitting from the device.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

A more complete understanding of these embodiments, and the attendant advantages and features thereof, will be more readily understood by reference to the following detailed description when considered in conjunction with the accompanying drawings. The drawings described herein may not be to scale, are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. Numerous specific details are set forth such as examples of specific components, devices, methods, and kits to provide a thorough understanding of embodiments of the present disclosure. It will be apparent to those skilled in the art that specific details need not he employed, that example embodiments may be embodied in many different forms and that neither should be construed to limit the scope of the disclosure in some example embodiments, well-known device structures are not described in detail.

Figure 1:
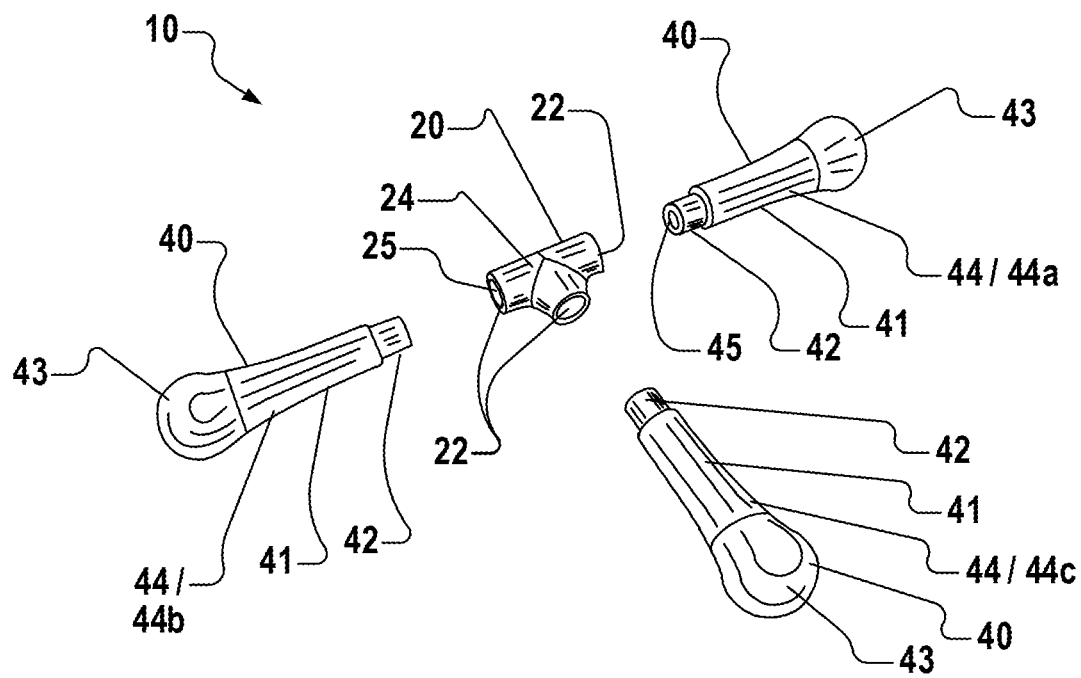
FIG. 1 is an exploded perspective view of a hand-eye coordination training device.
Figure 2:
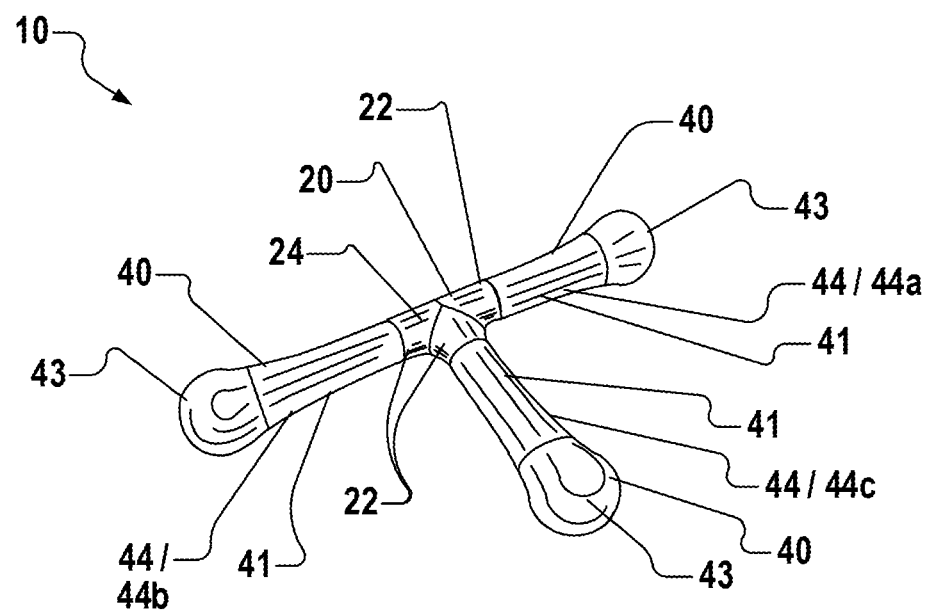
FIG. 2 is a perspective view of an assembled training device.

With reference to FIGS. 1-4, the present disclosure provides a training device 10 for improving hand-eye coordination. FIG. 1 shows an exploded view of some basic components. Hub 20 is a central piece to which at least two arms or handles 40 may releasably attach. This drawing shows three handles 40, each of similar shape, having a shaft 41 with a male connector or coupling 42 on one end and a bulb grip 43 on the other end. The grip 43 is not limited to a bulbous shape, but may be the same diameter as the shaft or any other shape that enables the handle 40 to be caught. The male coupling 42 of the handle 40 inserts into the female coupling 22 of the hub 20 to create a releasable attachment and to align the handle exterior surface 44 with the hub exterior surface 24, although the exterior surfaces 44, 24 do not necessarily have to be aligned, depending upon the design. The exterior surfaces 44 of the three handles 40 have colors 44a, 44b, and 44c. The couplings 22, 42 have interior surfaces 25 and 45, respectively. The assembled training device is depicted in FIG. 2.

In practice, users select and attach the handles 40 to be employed during a specific training and/or gaming session. Users may attach two, three, or more handles 40 and may place those handles 40 in various positions, depending upon the training device 10 configuration. Thus, the training device 10 is reconfigurable. For solo user play, a user will toss the training device 10 in the air and call a color (or handle type) to catch. With an electronic version a user will toss the training device 10 in the air, and the training device 10 will call a color (44a,b,c) and/or hand to use to make the catch. For multi-user play, users stand a designated distance from each other based upon skill level and comfort. The thrower or an announcer will make the call, and the recipient(s) of the toss will try to make a catch with the correct handle 40 and hand. The catcher then takes a turn as thrower. Adding multiple training devices 10 or other required body movement into the training mix significantly elevates the level of difficulty. In this way, training is available for one person or an entire team at one time.

Each handle 40 a may be visually differentiated in at least three ways—color, size, and shape. In a preferred embodiment, each handle 40 is a different color. This simple differentiation of handles 40 allows for one size and shape of handle 40 to be manufactured, thus allowing for a more economical product. In a related twist, each handle 40 may light up with a different color. Alternatively, the handles 40 may be different lengths, with one long, one short, and one of medium length, example, and the hub 20 may be placed off-center. As a further alternative, each handle 40 may be a different shape such as a triangle, circle, or square at the end of a shaft 41 for example. If lights, voice commands, and/or sounds are incorporated, the unit may also feature at least one sensor and at least one controller to enable this enhanced functionality. One of skill will know that some combination of these options may be used.

In a preferred embodiment, the training device 10 is composed of a material that remains generally stiff, but has a little flex, allows a comfortable weight for throwing and catching, and floats when thrown in water. The handles 40 may have a coating or texture to provide a better hold. However, the training device 10 may be comprised of a variety of materials, including, but not limited to, plastic, metal, rubber, foam, fabric, and composites. These materials may differ based upon the intended audience. For example, sports teams, the military, and emergency response personnel may use, harder and more durable materials for training. Young children, the elderly, and physical rehabilitation patients may use softer or lighter materials, perhaps with soft coverings.

Figure 3:
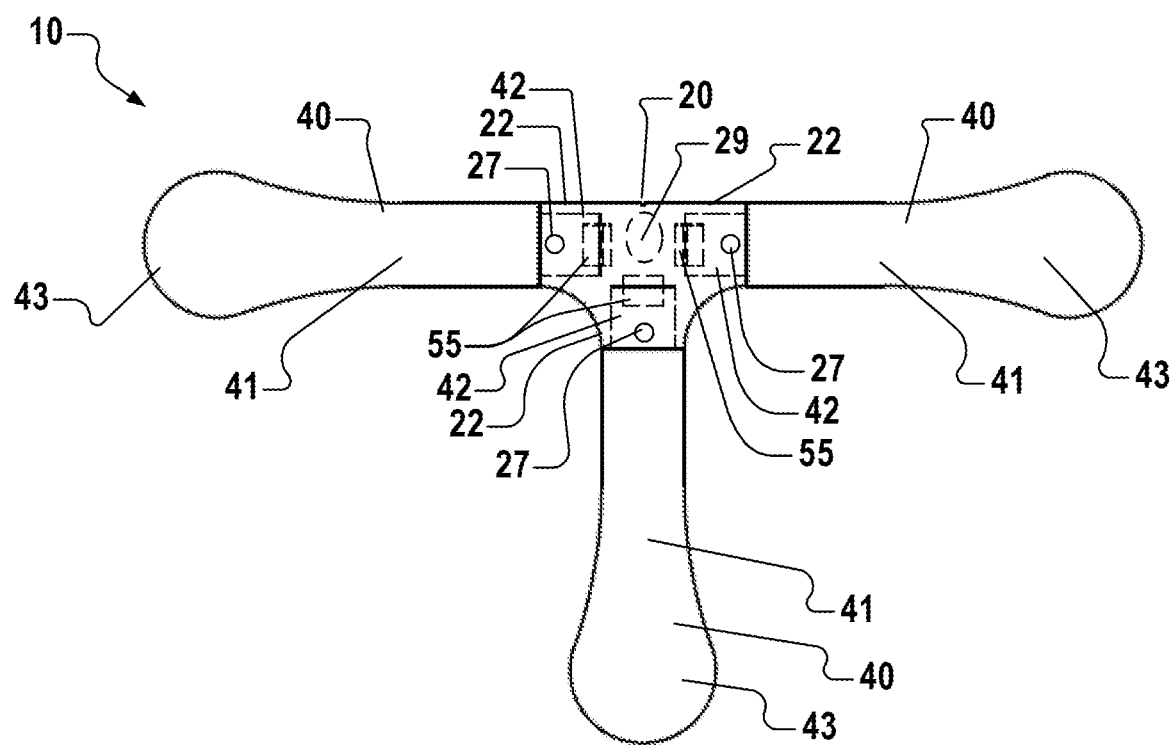
FIG. 3 is a top view of the training device.

FIG. 3 is a top view of the training device 10 as described thus far. Dashed lines show the male couplings 42 of the handles 40 inside the female couplings 22 of the hub 20. A variety of means are envisioned for forming this connection. In one configuration, the male coupling 42 and the female coupling 22 are both unthreaded and held together by friction, compression, or one or more magnets 55 and attracted materials placed in the male and female couplings 42, 22. In another configuration, the male and female couplings 42, 22 have mating threads. The couplings 22, 42 are not limited to magnetic or threaded connection, and a locking mechanism 27 may be employed to ensure that the pieces remain connected during use. One of skill in the art will realize that the training device 10 may be alternately configured with female connectors on the handles 40 and male connectors on the hub 20, or some combination thereof; in such a configuration, the hub 20 may appear to be nubbed. A controller 29 is also illustrated inside the hub 20.

Figure 4:
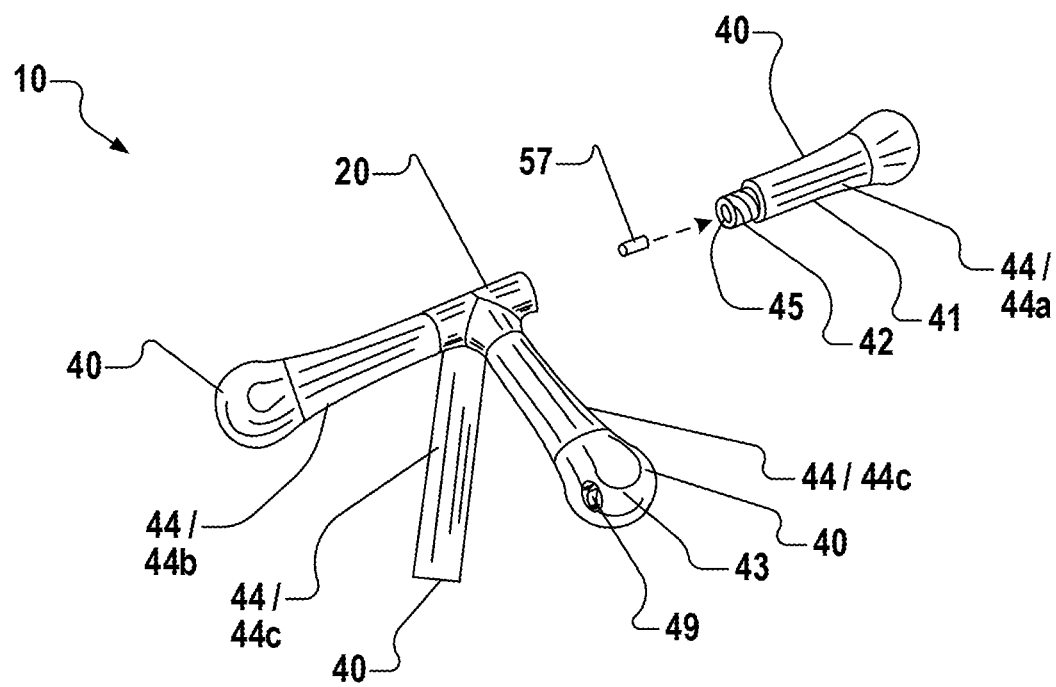
FIG. 4 is a perspective view of optional components of a training kit and training device.

The hub 20 is not limited to three couplings 22 or to a tee shape. Couplings 22 formed in one plane may create a hub 20 of a variety of shapes, including, but not limited to, T, Y, and X. Additional couplings 22 may be added in the same plane or in intersecting planes such that handles 40 may project in different directions, as shown in FIG. 4. Further, the hub 20 may resemble a sphere, ball, or other solid shape with couplings 22 inside. FIG. 4 illustrates an optional female coupling 49 inside a bulb grip 43 to offer attachment of another handle 40 for a more complex configuration and exercise. In effect, the grip 43 may act as a secondary hub. In one configuration, the hub 20 and one handle 40 may be formed together. Also shown is a cylindrical handle 40 without a bulb grip 43 that extends down from the hub 20 at a non-perpendicular angle to the other handles 40. Many configurations are possible, and each configuration alters the functionality of the training device 10—specifically regarding visual identification of different handles 40, weight and handling of the unit, and rotation and other movement of the training device 10, for example.

In a preferred embodiment, the handles 40 are hollow in order to reduce manufacturing costs and to make the handles 40 fillable. Fill material 57 may include, but is not limited to water, sand, dirt, pebbles, rice, or a metal slug. Fill material 57 may be prepackaged by the manufacturer in a pod, bag, or other insertable format to provide easy insertion for the user and a recommended or expected effect on the flight of the training device 10. In practice, the user may add one or more fill materials 57 to one or more handles 40, and the weight and distribution of the fill material 57 will affect the rotation of the training device 10 in flight. Rotation may be hard to predict, and motion may be "jerky," providing a greater challenge and more fun. One of skill will understand that the training device 10 is not limited to hollow or fillable members.

Referring again to FIGS. 1-4, one or more training devices 10 may be packaged as a set or kit utilized to improve hand-eye coordination. The packaged kit may include at least one hub 20, handles 40 of similar or varied shapes, sizes, and colors, special fill materials 57, electronics, a container or equipment bag, and training instructions. Separate kits may include different components that may be interchangeable to allow for greater reconfiguration. Whether the training device 10 is sold stand-alone and preassembled or in a kit, the training device provides functionality unrealized by the prior art. The multi-function design, allows the consumer to purchase one reconfigurable unit that lends itself to a higher likelihood of use and training.

Most kits are likely to utilize a limited number of handles 40 so the users will have sufficient understanding, ability, and fun; therefore, their frustration will also be limited, so they will be more likely to utilize the training device 10 in order to improve their hand-eye coordination and encourage other people to do the same. Users are also more likely to purchase the training device 10 and use it with a limited number of key components that keep the kit affordable.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A hand-eye coordination training device comprising:
   A) a hub having at least two couplings, each of said at least two couplings being a female coupling; and
   B) at least two handles, each handle having at least one coupling, each of said at least two handles comprising a shaft having first and second ends, with a male coupling at said first end and a bulb grip at said second end, said male coupling being releasable attached into said female coupling of said hub; wherein said male coupling has a first diameter, said shaft has a second diameter, and said bulb grip has a third diameter, said first diameter being smaller than said second and third diameters, and said third diameter being larger than said first and second diameters; wherein the at least one couplings on the at least two handles are configured to releasably attach to a corresponding number of couplings on the hub; and wherein the at least two handles are physically differentiated from one another by shape, size, color, or some combination of those attributes.

2. The training device of claim 1, wherein the hub comprises at least three couplings.

3. The training device of claim 1, wherein all couplings are configured for the at least two handles to be interchangeably attached.

4. The training device of claim 1, wherein the at least two handles are hollow.

5. The training device of claim 1, wherein all couplings are threaded.

6. The training device of claim 1, wherein each releasable attachment, of a hub coupling to a handle coupling is secured by a locking mechanism.

7. The training device of claim 1, the at least two handles further comprising a surface texture or coating to make them more grippable.

8. The training device of claim 1, wherein the at least two handles are configured to be held by a human hand.

9. The training device of claim 1, further comprising a material that floats in water.

10. The training device of claim 1, further comprising at least one controller and at least one sensor that control sound, light, or a combination of sound and light emitting from the training device.

11. The training device of claim 1, wherein at least one coupling on the hub lies in a different plane than at least two other couplings on the hub.

12. The training device of claim 1, wherein at least one coupling on the hub is formed as one piece with the hub.

13. A hand-eye coordination training device comprising: a hub having at least three couplings; and at least three handles configured to be held by a human hand, each handle having at least one coupling; wherein at least one handle is hollow, wherein the at least one coupling of the at least three handles are configured to interchangeably and releasably attach to the at least three couplings on the hub; and wherein the at least tree handles are physically differentiated from one another by shape, size, color, or a combination of those attributes.

14. The training device of claim 13, wherein each releasable attachment of a hub coupling to a handle coupling is secured by a locking mechanism.

15. The training device of claim 13, the at least two handles further comprising a surface texture or coating to make them more grippable.

16. The training device of claim 13, further comprising a material that floats in water.

17. The training device of claim 13, further comprising at least one controller and at least one sensor that control sound, light, or a combination of sound and light emitting from the training device.

18. A hand-eye coordination training kit comprising: a hub having at least three couplings; and at least three handles configured to be held by a human hand, each handle having at least one coupling; wherein at least one handle is hollow; wherein the at least one coupling of the at least three handles are configured to interchangeably and releasably attach to the at least three couplings on the hub; and wherein the at least three handles are physically differentiated from one another by shape, size, color, or a combination of those attributes, and said at least three handles are able to be viewed as different from several feet away by the human eye.

19. The training kit of claim 18, further comprising at least one fill material.

20. The training kit of claim 18, further comprising at least one controller and at least one sensor that control sound, light, or a combination of sound and light emitting from the training device.

* * * * *